(12) United States Patent
Sekiguchi et al.

(10) Patent No.: US 8,421,880 B2
(45) Date of Patent: Apr. 16, 2013

(54) IMAGE PROCESSING APPARATUS, IMAGE PROCESSING METHOD, AND IMAGE CAPTURING APPARATUS

(75) Inventors: Hiroyoshi Sekiguchi, Kanagawa (JP); Ryosuke Kasahara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 192 days.

(21) Appl. No.: 13/103,401

(22) Filed: May 9, 2011

(65) Prior Publication Data

US 2011/0292240 A1 Dec. 1, 2011

(30) Foreign Application Priority Data

May 25, 2010 (JP) ................................. 2010-119909
Dec. 7, 2010 (JP) ................................. 2010-272878

(51) Int. Cl.
*H04N 9/73* (2006.01)
(52) U.S. Cl.
USPC ......................................................... 348/228.1
(58) Field of Classification Search ............... 348/226.1, 348/228.1
See application file for complete search history.

(56) References Cited

U.S. PATENT DOCUMENTS

| | | | | |
|---|---|---|---|---|
| 6,710,818 B1 * | 3/2004 | Kasahara et al. | ........... | 348/226.1 |
| 7,043,093 B2 * | 5/2006 | Asano | ............................ | 382/274 |
| 7,106,368 B2 * | 9/2006 | Daiku et al. | ................ | 348/226.1 |
| 7,142,234 B2 * | 11/2006 | Kaplinsky et al. | ......... | 348/226.1 |
| 7,528,866 B2 * | 5/2009 | Kaplinsky et al. | ......... | 348/226.1 |
| 8,279,303 B2 * | 10/2012 | Niikura | ....................... | 348/226.1 |
| 2006/0279641 A1 * | 12/2006 | Takahashi et al. | ......... | 348/226.1 |
| 2007/0109425 A1 * | 5/2007 | Poplin et al. | ................ | 348/226.1 |
| 2008/0101721 A1 * | 5/2008 | Mori | ............................. | 382/275 |
| 2010/0013953 A1 * | 1/2010 | Niikura | ....................... | 348/226.1 |
| 2012/0200736 A1 * | 8/2012 | Toyoda | ....................... | 348/226.1 |
| 2012/0320233 A1 * | 12/2012 | Niikura | ....................... | 348/226.1 |

FOREIGN PATENT DOCUMENTS

| | | | | |
|---|---|---|---|---|
| JP | 2002330350 A | * | 11/2002 | |
| JP | 2008-109253 | | 5/2008 | |
| JP | 2008109370 A | * | 5/2008 | |
| JP | 2009-33310 | | 2/2009 | |

\* cited by examiner

*Primary Examiner* — John Villecco
(74) *Attorney, Agent, or Firm* — Oblon, Spivak, McClelland, Maier & Neustadt, L.L.P.

(57) ABSTRACT

An image processing apparatus includes: a difference calculation unit that calculates a difference value of a feature amount of image data of a predetermined region between a present frame and a past frame; a first counting unit that counts number of times when an absolute value of the difference value exceeds a threshold during a predetermined period of time; a second counting unit that counts number of times when the difference value of the image data have different plus-minus signs between a present frame and a past frame during a predetermined period of time; and an identification unit that identifies a light source frequency by comparing the output of the second counting unit with a predetermined value when the output of the first counting unit exceeds a predetermined value.

12 Claims, 14 Drawing Sheets

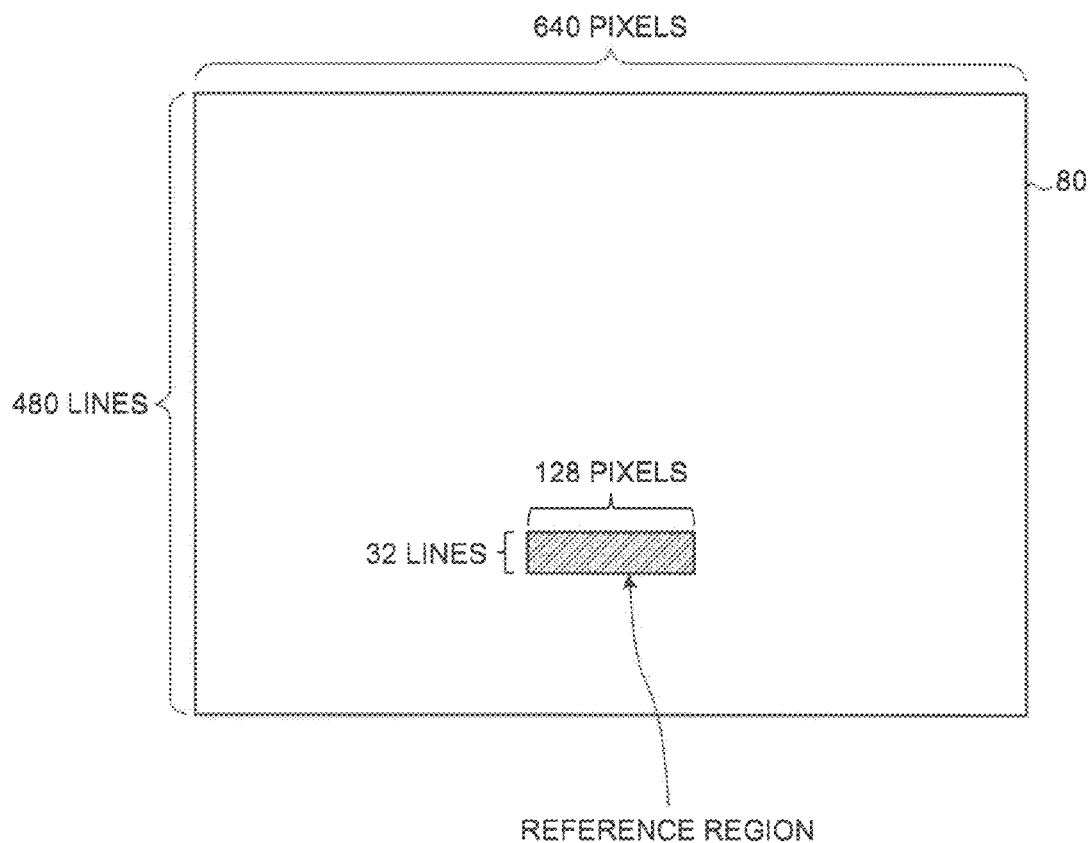

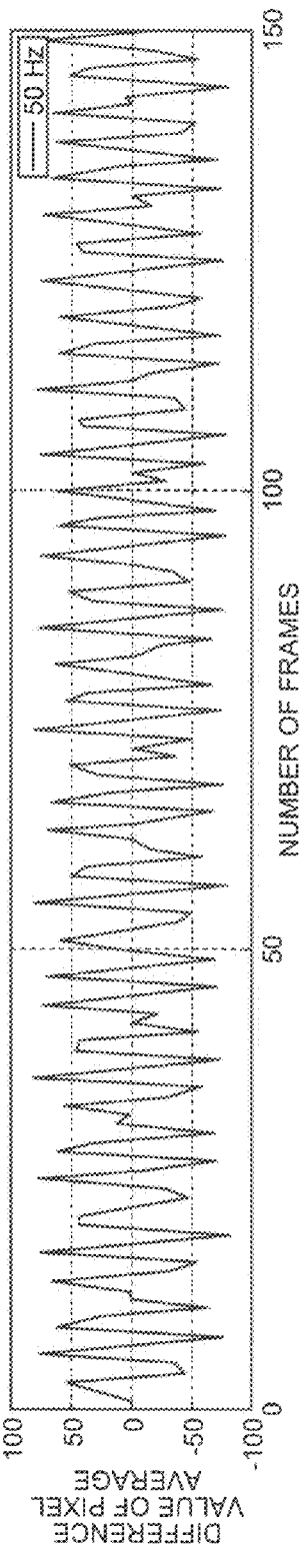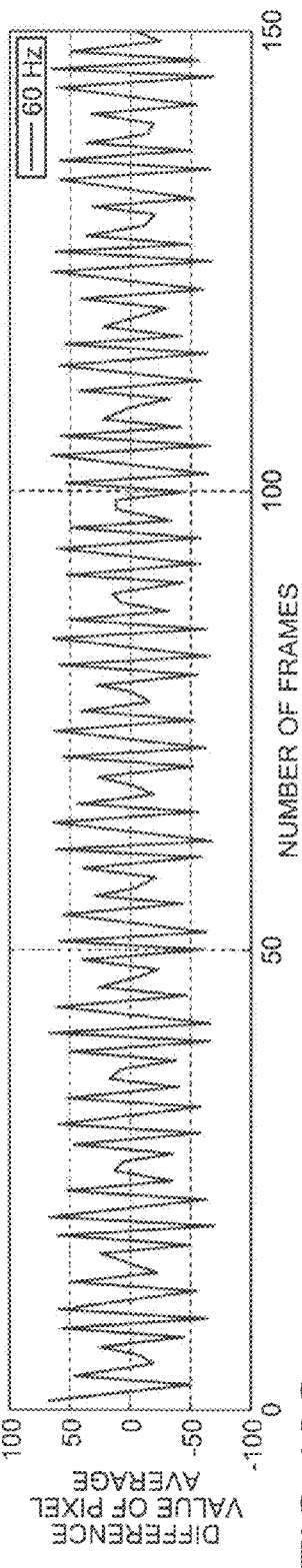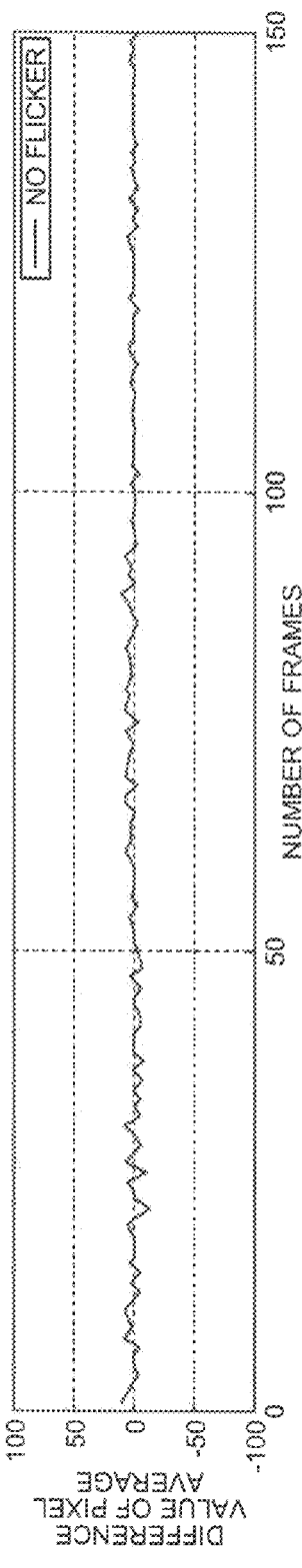

REFERENCE REGION   PART OF VEHICLE BODY
(DASHBOARD)

| LINE NUMBER | POSITION IN IMAGE |
|---|---|
| LINE 1 TO 19 (19 LINES) | BLANKING |
| LINE 20 TO 263 (244 LINES) | EFFECTIVE IMAGE PERIOD (FIRST FIELD) |
| LINE 264 TO 282 (19 LINES) | BLANKING |
| LINE 283 TO 525 (243 LINES) | EFFECTIVE IMAGE PERIOD (SECOND FIELD) |

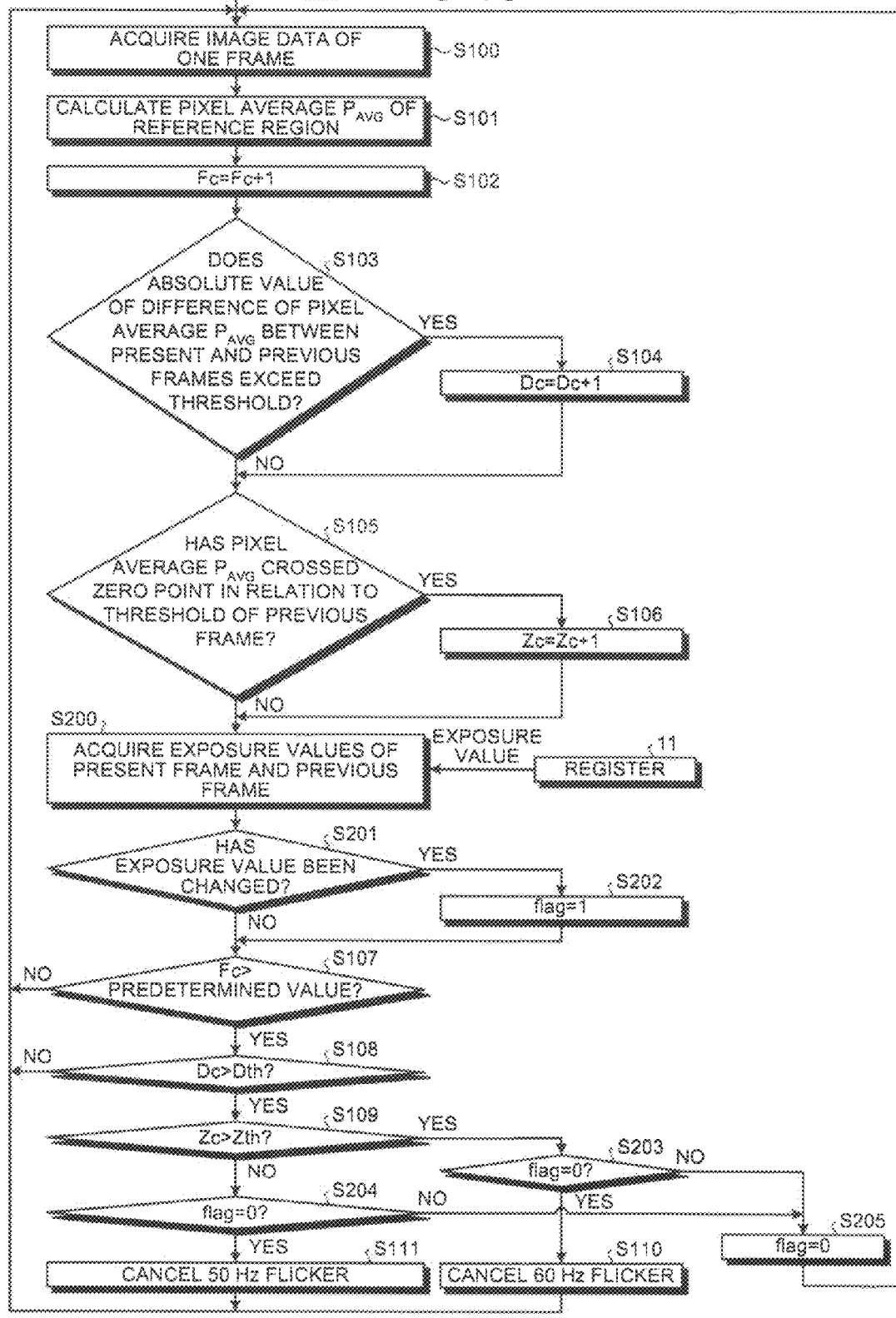

IMAGE PROCESSING APPARATUS, IMAGE PROCESSING METHOD, AND IMAGE CAPTURING APPARATUS

CROSS-REFERENCE TO RELATED APPLICATIONS

The present application claims priority to and incorporates by reference the entire contents of Japanese Patent Application No. 2010-119909 filed in Japan on May 25, 2010 and Japanese Patent Application No. 2010-272878 filed in Japan on Dec. 7, 2010.

BACKGROUND OF THE INVENTION

1. Field of the Invention

The present invention relates to an image processing apparatus that processes image data captured by a rolling shutter system, an image processing method, and an image capturing apparatus.

2. Description of the Related Art

Recently, vehicle-mounted cameras have been markedly popularized. Image data, taken by a vehicle-mounted camera while a vehicle is moving, is recorded, and is used as an evidential matter when an accident occurs, or edited for pleasure, for example. A complementary metal-oxide semiconductor (CMOS) image sensor is an example of image capturing elements used for vehicle-mounted cameras. The CMOS image sensor is an X-Y address type, and reads image data by using a rolling shutter.

When a subject is imaged by using an image capturing element having the rolling shutter under illumination by a light source blinking at a predetermined frequency, such as a fluorescent lamp directly lighted by a commercial alternating-current power source, non-uniform luminance occurs in a vertical direction in each frame of image data if the exposure time is made significantly shorter than the emission period of a light source. When a frame rate of imaging and the light emission cycle of the light source are different from each other, non-uniform state of luminance in the vertical direction changes and luminance flicker (so-called fluorescent lamp flicker) occurs in a temporal direction. This is because the rolling shutter, unlike a global shutter, cannot expose all of the pixels with the same timing under illumination if a periodically blinking light source is used.

In Japan, a frequency of a commercial alternating-current power source differs in two areas. Roughly, the frequency is 50 Hz in an area on the east side of the Itoigawa-Shizuoka tectonic line (50 Hz area) while the frequency is 60 Hz in an area on the west side of the Itoigawa-Shizuoka tectonic line (60 Hz area). A vehicle provided with a vehicle-mounted camera using an image capturing element having the rolling shutter may run across a border between the 50 Hz area and the 60 Hz area. In this case, if the vehicle-mounted camera uses a flicker elimination filter that corresponds to either a frequency of 50 Hz or 60 Hz, flicker occurs in image data produced by the vehicle-mounted camera when the vehicle runs in an area of the other frequency.

Japanese Patent Application Laid-open No. 2008-109253 discloses a technique which determines whether a light source is a fluorescent lamp of a non-inverter system when imaging is carried out by using a rolling shutter, and which determines whether the driving frequency of the fluorescent lamp is 50 Hz or 60 Hz if the light source is the fluorescent lamp of a non-inverter system.

In other words, in Japanese Patent Application Laid-open No. 2008-109253, a normal exposure image under $1/60$ second exposure and a short time exposure image under $1/240$ second exposure are alternately imaged by using the rolling shutter when the frame rate of data acquisition is 60 frames per second (fps), for example. Then, it is detected whether the light source is a fluorescent lamp of a non-inverter system by comparing the luminance distributions in the vertical direction between the normal exposure image and the temporally adjacent short time exposure image. If the light source is the fluorescent lamp of a non-inverter system, it is detected whether the driving frequency of the fluorescent lamp is 50 Hz or 60 Hz by comparing the luminance distributions in the vertical direction between the two short time exposure images that are temporally adjacent to each other.

The method disclosed in Japanese Patent Application Laid-open No. 2008-109253, however, has a problem in that two types of exposure need to be carried out so that the control of the image capturing apparatus becomes complicated. In addition, another problem arises in that a system becomes complex by the need to have a memory that stores the luminance distributions in the vertical direction.

SUMMARY OF THE INVENTION

It is an object of the present invention to at least partially solve the problems in the conventional technology.

According to an aspect of the present invention, there is provided an image processing apparatus including: a difference calculation unit that calculates a difference value indicating a difference between a feature amount of a predetermined region of a frame of image data taken by and output by an image capturing unit capturing a subject and a feature amount of the predetermined region of a past frame relative to the frame of the image data; a first counting unit that counts number of times when an absolute value of the difference value calculated by the difference value calculation unit exceeds a threshold during a predetermined period of time; a second counting unit that counts number of times when the difference value calculated by the difference value calculation unit on a present frame of the image data and the difference value calculated by the difference value calculation unit on a past frame of the image data have different plus-minus signs from each other during a predetermined period of time; and an identification unit that compares the number of times counted by the second counting unit with a predetermined value when the number of times counted by the first counting unit exceeds a predetermined value, and based on a comparison result thus obtained, identifies a light source frequency of a light source under which the subject is captured.

According to another aspect of the present invention, there is provided an image processing method including: calculating a difference value, by a difference calculation unit, indicating a difference between a feature amount of a predetermined region of a frame of image data taken and output by an image capturing unit that captures a subject and a feature amount of the predetermined region of a past frame relative to the frame of the image data; counting number of times, by a first counting unit, when an absolute value of the difference value calculated at the calculating the difference value exceeds a threshold during a predetermined period of time; counting number of times, by a second counting unit, when the difference value calculated at the difference value calculation unit on a present frame of the image data and the difference value calculated at the difference value calculation unit on a past frame of the image data have different plus-minus signs from each other during a predetermined period of time; and comparing, by an identification unit, the number of times counted by the second counting unit with a predetermined value when the number of times counted by the first counting unit exceeds a predetermined value, and identifying a light source frequency of a light source under which the subject is captured based on a comparison result.

According to still another aspect of the present invention, there is provided an image capturing apparatus including: an image capturing unit; and the image processing apparatus described above.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic illustrating an example of a reference region;

FIG. 4 is a table to describe a method for calculating a pixel average $P_{AVG}$ of the reference region;

In FIGS. 10A, 10B, and 10C, graphs illustrate inter-frame difference values of the pixel averages $P_{AVG}$ of a reference region obtained by actual measurements in accordance with the elapsed time;

FIG. 15 is a flowchart illustrating exemplary processing of a flicker suppression method of the second embodiment.

DETAILED DESCRIPTION OF THE PREFERRED EMBODIMENTS

First Embodiment

Figure 1:
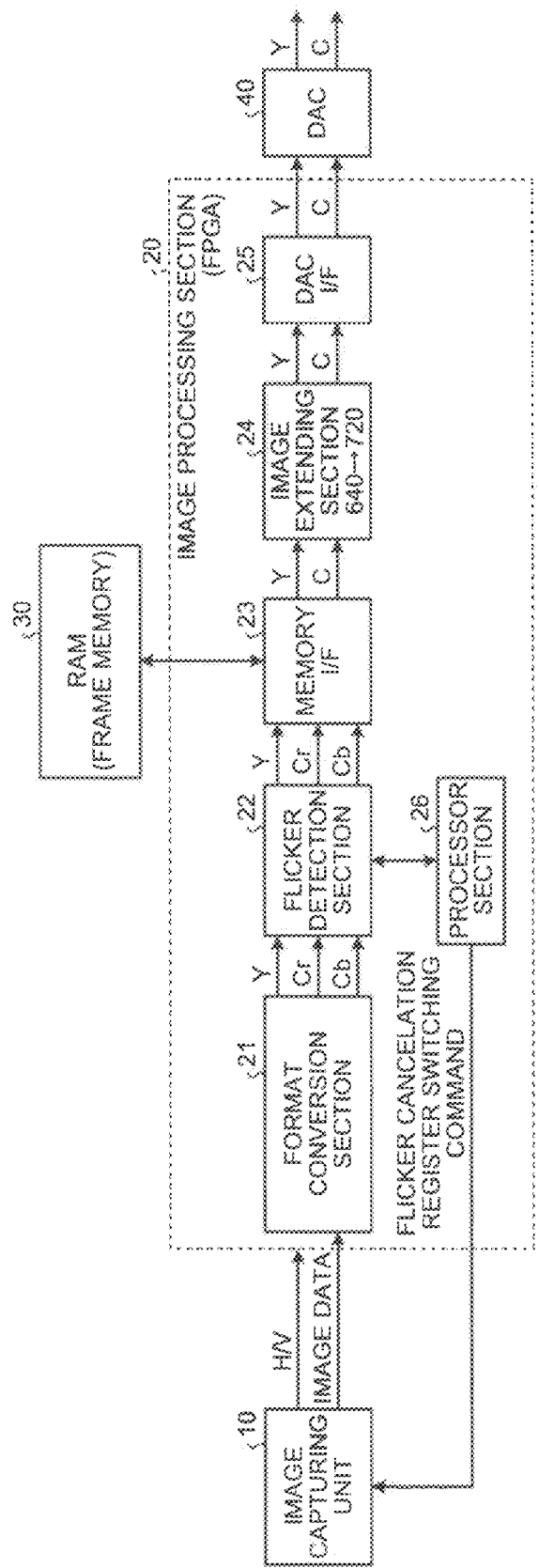
FIG. 1 is a block diagram illustrating an exemplary structure of an image capturing apparatus applicable to a first embodiment of the present invention.

A first embodiment of an image processing apparatus according to the present invention is described below in detail with reference to the accompanying drawings. FIG. 1 is a schematic illustrating an example of an image capturing apparatus applicable to the first embodiment of the present invention. The image capturing apparatus includes an image capturing unit 10, an image processing section 20, and a random access memory (RAM) 30. A digital-to-analog (D/A) converter (DAC) 40 changes image data, which is an output of the image processing section 20, into an analog image signal, which is forwarded to a subsequent stage.

The image capturing unit 10 includes an image capturing element, a signal processing section that carries out predetermined processing such as noise removal and auto gain control (AGC) to a captured image, which is an output of an image capturing element, and an A/D converter that transforms an image signal processed by the image capturing signal processing section into digital image data. A complementary metal-oxide semiconductor (CMOS) image sensor is used for the image capturing element, and exposure is carried out in a line-sequential manner by a rolling shutter system. Exposure time is set by a value written in a register (not illustrated) included in the image capturing unit 10.

The image capturing unit 10 outputs image data of a captured subject with YCbCr422 format, for example, and also outputs a vertical synchronizing signal $V_{sync}$ and a horizontal effective pixel synchronizing signal $H_{ref}$. The horizontal effective pixel synchronizing signal $H_{ref}$ corresponds to an effective pixel region in one line. In the embodiment, the effective image region of an image data is represented by 640 pixels in a horizontal direction (referred to as horizontal 640 pixels)×480 lines in a vertical direction (referred to as vertical 480 lines).

The image processing section 20, which is structured with a field programmable gate array (FPGA), for example, includes a format conversion section 21, a flicker detection section 22, a memory interface (I/F) 23, an image extending section 24, a DAC interface (I/F) 25, and a processor section 26. The format conversion section 21 converts image data of YCbCr422 format output from the image capturing unit 10 into the image data of YCbCr444 format, and outputs image data of a luminance component Y, and color difference components Cr and Cb.

Hereinafter, the three different types of the image data, i.e., the luminance component Y, and the color difference components Cr and Cb are collectively referred to as "image data" unless otherwise described.

The flicker detection section 22 calculates a feature amount of the image data output from the format conversion section 21 by using the image data, and the vertical synchronizing signal $V_{sync}$ and the horizontal effective pixel synchronizing signal $H_{ref}$ that are output from the image capturing unit 10. The flicker detection section 22 produces, from the calculated feature amount, information necessary to carry out processing for canceling flicker, and sends the information to the processor section 26.

The processor section 26 detects presence or absence of flicker in image data based on the information received from the flicker detection section 22. If flicker is detected, the processor section 26 determines the light source frequency of a subject light source that causes the flicker. The processor section 26 produces a flicker cancelation register switching command according to the result of the determination, and rewrites a value of the register that is included in the image capturing unit 10 to be used for setting exposure time. As a result, exposure time of the image capturing element is set to a value matching the light source frequency, whereby the occurrence of flicker is suppressed.

In suppressing the occurrence of flicker, the exposure time of the image capturing element is set so as to carry out exposure at a period corresponding to the light source frequency of the subject light source. For example, the exposure time of the image capturing element is set so as to carry out exposure at a period of 100 Hz in an area with a commercial alternating-current power source of 50 Hz where the light source frequency is 100 Hz.

The flicker detection section 22 also outputs image data supplied from the format conversion section 21 without processing it. The image data is written in the RAM 30 through the memory I/F 23. The RAM 30 is used as a frame memory, for example, in which image data of one frame is written.

The image extending section 24 reads image data of one frame written in the RAM 30 through the memory I/F 23, and extends the size of the read data in the horizontal direction by an interpolation processing, for example. For example, the image extending section 24 extends the size of original image data of horizontal 640 pixels×vertical 480 lines to the size of image data of horizontal 720 pixels×vertical 480 lines. The image extending section 24 carries out the image data extending process so as to meet the specification of the DAC 40 provided in a later stage.

The image data extended by the image extending section 24 is output through the DAC I/F 25. The DAC 40 converts the image data output from the DAC I/F 25 into an analog image signal, to be forwarded to the subsequent stage.

Figure 2:
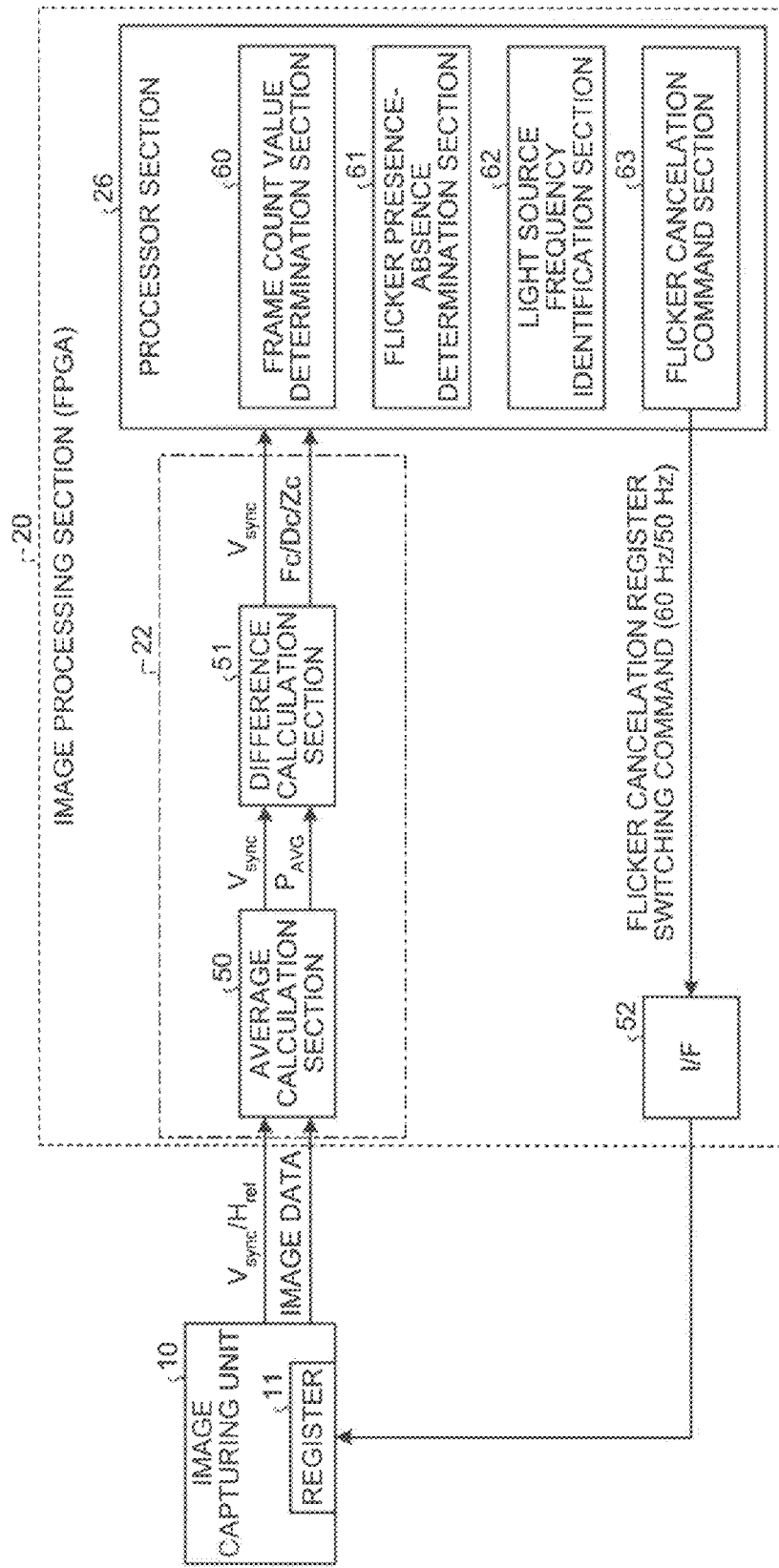
FIG. 2 is a functional block diagram illustrating a structure of an image processing section with selected sections closely related to the first embodiment.

FIG. 2 is a functional block diagram illustrating a structure of the image processing section 20 with selected sections closely related to the first embodiment. The flicker detection section 22 includes an average calculation section 50 and a difference calculation section 51. The average calculation section 50 calculates an average of pixel values within a reference region (hereinafter, referred to as a pixel average $P_{AVG}$) as the feature amount of image data output from the image capturing unit 10 on a frame-by-frame basis. The reference region is set to a predetermined region in an image represented with the image data output from the image capturing unit 10. Pixel data values of the luminance component Y out of the image data can be used as the pixel values, for example. Applicable data values are not limited to those of the luminance component Y, and thus pixel data values of the color difference component Cr or Cb may be used.

FIG. 3 illustrates an example of the reference region. The reference region is exemplarily set at a predetermined location within a captured image 80 that is represented with image data and of horizontal 640 pixels×vertical 480 lines. In the example of FIG. 3, the size of the reference region is represented as horizontal 128 pixels×vertical 32 lines. In the example of FIG. 3, the reference region is provided at a lower area in the captured image 80. The location of the reference region, however, is not limited to the example. The reference region may be provided at any location within the captured image 80.

A calculation method of the pixel average $P_{AVG}$ of the reference region is described with reference to FIG. 4. Let the number of horizontal pixels be a value M while the number of lines (the number of pixels in the vertical direction) be a value N, herein. The average calculation section 50 sums up the pixel values of all of the pixels within the reference region, and calculates the pixel average $P_{AVG}$ by dividing the sum by the number of pixels within the reference region as represented by formula (1).

$$\text{PIXEL AVERAGE } P_{AVG} = \frac{\sum_{n=1}^{N}\sum_{m=1}^{M}\{D(n, m)\}}{N \times M} \quad (1)$$

The average calculation section 50 outputs the vertical synchronizing signal $V_{sync}$ and the pixel average $P_{AVG}$ calculated by using the pixel data within the reference region as described above to the difference calculation section 51. The difference calculation section 51 calculates a difference value between the pixel average $P_{AVG}$ of a present frame thus supplied and the pixel average $P_{AVG}$ of a previous frame retained in a register (not illustrated), for example. The difference calculation section 51 counts the number of times when an absolute value of this difference value exceeds a threshold, and outputs the resulting number as a count value Dc.

The difference calculation section 51 counts the number of times when the pixel average $P_{AVG}$ crosses a zero point in transition of image data from the previous frame to the present frame, and outputs the resulting number as a count value Zc. The difference calculation section 51 counts the number of times when the vertical synchronizing signal $V_{sync}$ is output so as to obtain a frame count value Fc. The vertical synchronizing signal $V_{sync}$, the count value Dc, the count value Zc, and the frame count value Fc are sent to the processor section 26.

The processor section 26 includes a frame count value determination section 60, a flicker presence-absence determination section 61, a light source frequency identification section 62, and a flicker cancelation command section 63. The frame count value determination section 60 determines whether the frame count value Fc received from the difference calculation section 51 reaches a predetermined value. When the frame count value determination section 60 determines that the frame count value Fc exceeds the predetermined value, the flicker presence-absence determination section 61 determines whether the count value Dc received from the difference calculation section 51 exceeds a predetermined value Dth. The light source frequency identification section 62 determines the light source frequency of image data whether it is 50 Hz or 60 Hz based on the pixel averages $P_{AVG}$ of the present frame and the previous frame when the count value Dc exceeds the predetermined value Dth.

The flicker cancelation command section 63 produces a flicker cancelation register switching command for setting exposure time to the image capturing unit 10 according to the identification result of the light source frequency identification section 62. This command is supplied to an interface (I/F) 52. The I/F 52 rewrites a content of a register 11 included in the image capturing unit 10 and storing therein a value for setting exposure time (exposure value), according to the command.

As is known in the art, setting the exposure time of the image capturing unit 10 to an integral multiple of the period of the light source frequency can cancel flicker of image data. For example, flicker can be canceled by setting exposure time to 100 Hz, i.e., a period of $1/100$ second, when the light source frequency is 50 Hz. Likewise, flicker can be canceled by setting exposure time to 120 Hz, i.e., an integral multiple of a period of $1/120$ second, when the light source frequency is 60 Hz. The flicker cancelation command section 63 produces a flicker cancelation register switching command so as to set exposure time to $1/100$ second or $1/120$ second depending on the identification result of the light source frequency.

Figure 5:
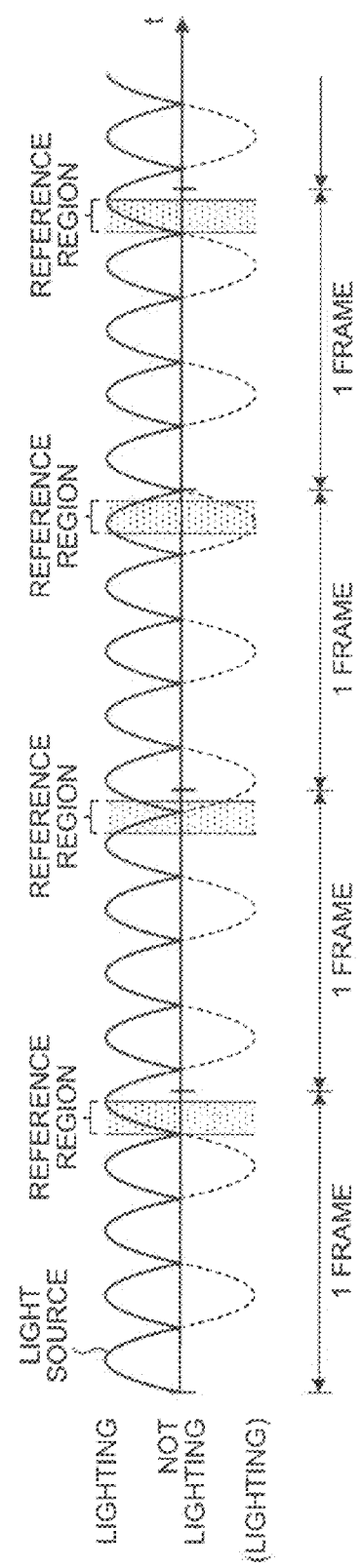
FIG. 5 is a schematic to describe an identification method of a light source frequency of the first embodiment.

An identification method of the light source frequency of the first embodiment is described in detail below with reference to FIG. 5. FIG. 5 schematically illustrates an exemplary relationship between a frame rate and a blinking period of a light source (light source frequency). In FIG. 5, the abscissa axis represents elapse of time.

For example, an electric-discharge lamp, such as a fluorescent lamp and a mercury lamp of a non-inverter system, blinks at a frequency that is double a power source frequency. In the rolling shutter system, dark stripes extending in the horizon direction appear in a captured image with the vertical intervals that correspond to the blinking period when the exposure time does not match the light source frequency because exposure is carried out line-sequentially. In addition, when the light source frequency does not synchronize with the frame rate, flicker occurs in such a manner that the dark stripes extending in the horizontal direction move in the vertical direction because a blinking position in a frame shifts on a frame-by-frame basis as exemplarily illustrated in FIG. 5. In the first embodiment, such flicker that moves in the vertical direction is suppressed. In the following descriptions, the term "flicker" means the flicker that moves in the vertical direction unless otherwise described.

A method for determining presence or absence of flicker is described below. A reference region is set to a predetermined region located at least in the vertical direction in an image. The pixel average $P_{AVG}$ is calculated in the reference region as the feature amount of the image. The difference of the calculated pixel average $P_{AVG}$ between frames (hereinafter, also referred to as an inter-frame difference of the pixel average $P_{AVG}$) is obtained. As described above, flicker is caused by the dark stripes extending in the horizontal direction sequentially changing on a frame-by-frame basis. Because of the occurrence mechanism, presence or absence of flicker can be determined by the following manner: the inter-frame difference of the pixel average $P_{AVG}$ of the reference region restricted within the predetermined region is obtained as described above, and then when an absolute value of the difference exceeds a predetermined threshold, it is determined that flicker is present.

In the embodiment, the average of the pixel values of the pixels within the reference region is used as the feature amount of the image. The feature amount, however, is not limited to the average. For example, the sum of the pixel values of the pixels within the reference region may be used as the feature amount of the image.

Here, it can be said that processing of obtaining an absolute value of the inter-frame difference of the pixel average $P_{AVG}$ is equivalent to the process of obtaining an inter-frame change of a ratio of a part of dark stripes due to flicker to a part of bright areas in the reference region. Accordingly, it is preferable that the size of the reference region in the vertical direction is set to be equal to or smaller than a half of an interval of the blinking period of the light source (refer to FIG. 5). In other words, the reference region is determined in such a manner that a ratio of the size of the reference region in the vertical direction to the size of the image represented with image data in the vertical direction is smaller than a ratio of the frame rate of the image data to four times of the light source frequency serving as a reference. The determination of the size of the reference region in the vertical direction as described above enables the inter-frame change in the ratio of the part of dark stripes due to flicker and the part of bright areas in the reference region to be more accurately detected. This method can be applicable to both 50 Hz and 60 Hz of the light source frequency serving as a reference.

Practically, in the method, the number of times when the absolute value of the difference exceeds a threshold is counted over a plurality of frames in order to eliminate noise effects and the like of an image, and when a resulting count value Dc exceeds the predetermined value Dth, it is determined that flicker is present.

A method for determining the light source frequency is described below. When it is determined that flicker is present in the determination of presence or absence of flicker, the number of times when the difference crosses zero between frames is counted during a predetermined frame duration so as to obtain the count value Zc. Then, the count value Zc is compared with a predetermined value Zth. As a result of the comparison, if the count value Zc is larger than the predetermined value Zth, it is determined that the light source frequency is 60 Hz while if the count value Zc is smaller than the predetermined value Zth, it is determined that the light source frequency is 50 Hz.

In other words, the inter-frame difference of the pixel average $P_{AVG}$ periodically fluctuates as the frame is renewed when the blinking period of the light source and the frame rate do not match. A period of the difference fluctuation is determined according to a ratio of the blinking period of the light source to the frame rate. Accordingly, the blinking period of the light source, i.e., the light source frequency, can be determined by finding the period of the difference fluctuation if the frame rate is fixed.

Figure 6:
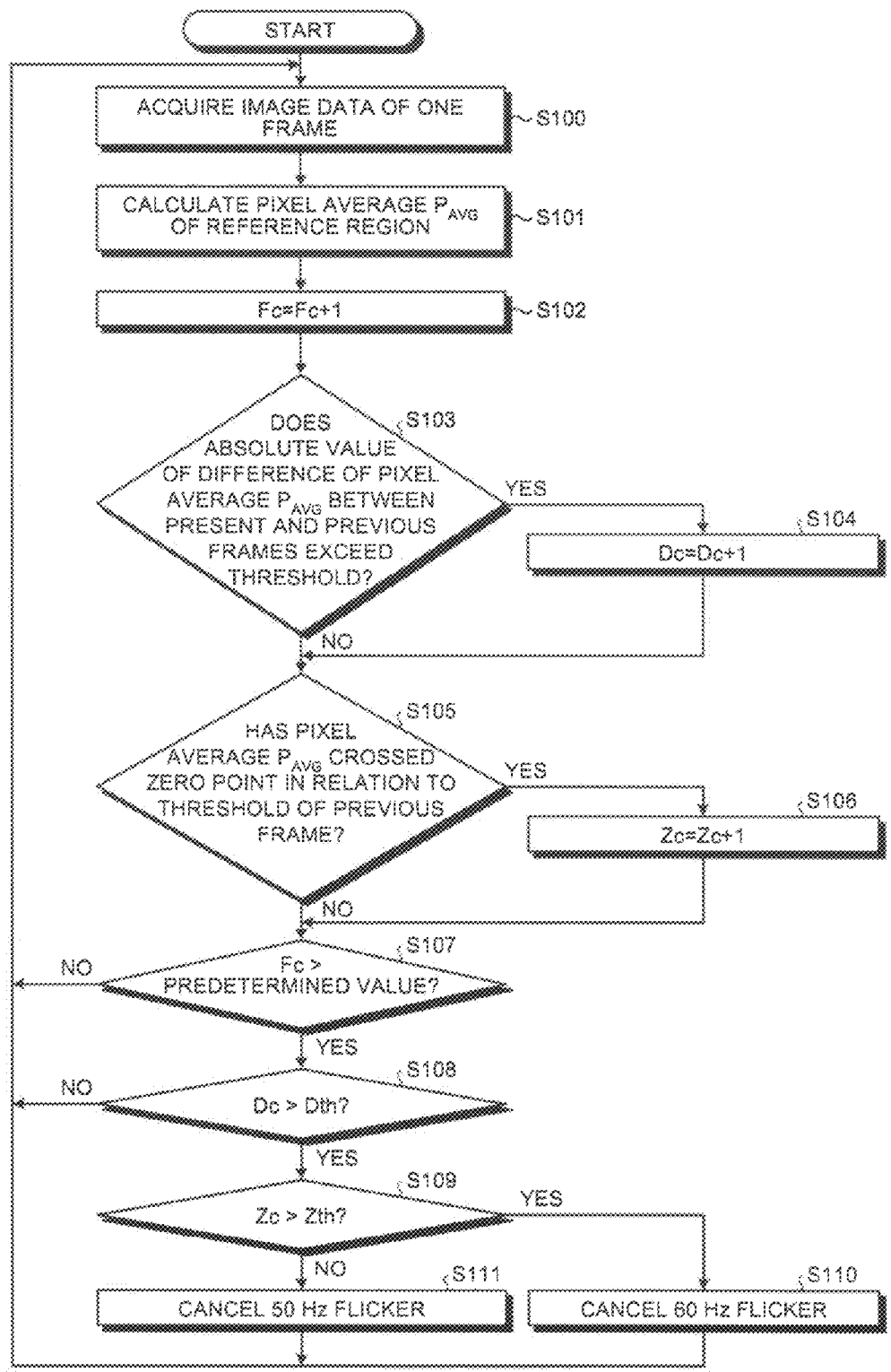
FIG. 6 is a flowchart illustrating exemplary processing of a flicker suppression method of the first embodiment.

FIG. 6 is a flowchart illustrating exemplary processing of a flicker suppression method of the first embodiment. The process illustrated in the flowchart of FIG. 6 is an exemplary case when a frame rate fr of image data output from the image capturing unit 10 is in the range: 25 Hz<fr<27.5 Hz. The frame count values Fc, Dc, and Zc are initialized to zero prior to the processing illustrated in the flowchart.

At step S100, the flicker detection section 22 acquires image data of one frame that is captured by the image capturing unit 10. At step S101, the average calculation section 50 of the flicker detection section 22 extracts pixels of a reference region in an image of one frame, and calculates the pixel average $P_{AVG}$ from pixel values of the extracted pixels with the formula (1).

At step S102, the flicker detection section 22 increments the frame count value Fc by one. Then, the processing proceeds to step S103. The frame count value Fc is sent to the processor section 26. At step S103, the difference calculation section 51 calculates an absolute value of a difference between the pixel average $P_{AVG}$ of a present frame and the pixel average $P_{AVG}$ of a previous frame. The pixel average $P_{AVG}$ of the previous frame is retained in a register, for example. The flicker detection section 22 determines whether the calculated absolute value of the difference exceeds a preset threshold. If it is determined that the calculated absolute value of the difference does not exceed the preset threshold, the processing proceeds to step S105. Conversely, if it is determined that the calculated absolute value of the difference exceeds the preset threshold, the count value Dc is incremented by one at step S104. Then, the processing proceeds to step S105. The count value Dc is sent to the processor section 26.

At step S105, the flicker detection section 22 determines whether the pixel average $P_{AVG}$ of the present frame has crossed a zero point in relation to the pixel average $P_{AVG}$ of the previous frame. Specifically, the flicker detection section 22 determines whether the pixel averages $P_{AVG}$ of the present and previous frames have different signs (plus and minus) from each other. If they have different signs (plus and minus) from each other, it can be determined that the pixel average $P_{AVG}$ of the present frame has crossed the zero point. If it is determined that the pixel average $P_{AVG}$ of the present frame has not crossed the zero point, the processing proceeds to step S107.

Conversely, if it is determined that the pixel average $P_{AVG}$ of the present frame has crossed the zero point, the count value Zc is incremented by one at step S106. Then, the processing proceeds to step S107. The count value Zc is sent to the processor section 26.

At step S107, the frame count value determination section 60 included in the processor section 26 determines whether the frame count value Fc exceeds a predetermined value. If it is determined that the frame count value Fc does not exceed the predetermined value, the processing returns to step S100 so as to process a subsequent frame. Conversely, if it is determined that the frame count value Fc exceeds the predetermined value, the processing proceeds to step S108.

At step S108, the flicker presence-absence determination section 61 included in the processor section 26 determines whether the count value Dc exceeds the preset threshold Dth. In other words, the processor section 26 detects the presence or absence of flicker at step S108. If it is determined that the count value Dc does not exceed the threshold Dth, the processing returns to step S100 so as to process a subsequent frame. Conversely, if it is determined that the count value Dc exceeds the threshold Dth, the processing proceeds to step S109.

At step S109, the light source frequency identification section 62 included in the processor section 26 compares the count value Zc with the predetermined value Zth. In other words, the processor section 26 identifies the light source frequency at step S109. As a result of the comparison, if it is determined that the count value Zc exceeds the predetermined value Zth, the light source frequency is identified as 60 Hz, and the processing proceeds to step S110. At step S110, the flicker cancelation command section 63 included in the processor section 26 produces a flicker cancelation register switching command so as to cancel the flicker for the light source frequency of 60 Hz. The command is supplied to the interface I/F 52. Following this command, the I/F 52 rewrites a value of the register 11 included in the image capturing unit 10.

On the other hand, if it is determined that the count value Zc is equal to or smaller than the predetermined value Zth as the result of the comparison at step S109, the light source frequency identification section 62 identifies the light source frequency as 50 Hz. Then, the processing proceeds to step S111. At step S111, the flicker cancelation command section 63 produces a flicker cancelation register switching command so as to cancel the flicker for the light source frequency of 50 Hz. This command is supplied to the I/F 52. Following this command, the I/F 52 rewrites a value of the register 11 included in the image capturing unit 10.

When the processing at step S110 or step S111 is completed, the processing returns to step S100 so as to process a subsequent frame in a similar manner.

The judgment condition at step S109 depends on the frame rate fr of image data output from the image capturing unit 10. For example, when the frame rate fr is in the range from 25 fps to 30 fps, the judgment is made as is illustrated in FIG. 6 if 25 fps<fr<27.5 fps, whereas the judgment becomes the opposite if 27.5 fps<fr<30 fps. Specifically, if 27.5 fps<fr<30 fps, the flicker cancelation command section 63 produces a flicker cancelation register switching command in order to cancel flicker under the light source frequency of 50 Hz if the counter value Zc exceeds the predetermined value Zth while the flicker cancelation command section 63 produces a flicker cancelation register switching command in order to cancel flicker under the light source frequency of 60 Hz if the counter value Zc is equal to or smaller than the predetermined value Zth.

Another example is that the judgment is made as illustrated in FIG. 6 for 50 fps<fr<55 fps when the frame rate fr is in the range from 50 fps to 60 fps. On the contrary, for 55 fps<fr<60 fps, the judgment becomes the opposite for the case 50 fps<fr<55 fps. When the frame rate fr is 27.5 fps or 55 fps, it is supposed that the light source frequency cannot be identified because the counter value Zc becomes nearly equal between the two frequencies 50 Hz and 60 Hz of the light source.

The frame rate fr may be fixed at the image capturing unit 10, for example, by keeping its value preliminarily in a read only memory (ROM) or the like in the flicker detection section 22. The image capturing unit 10 may also send information indicating the frame rate fr to the image processing section 20 to let the flicker detection section 22 receive the information. Furthermore, the frame rate fr of image data output from the image capturing unit 10 may be acquired by measuring the intervals of the vertical synchronizing signal $V_{sync}$, for example, in the image processing section 20 such as the flicker detection section 22.

Figure 7:
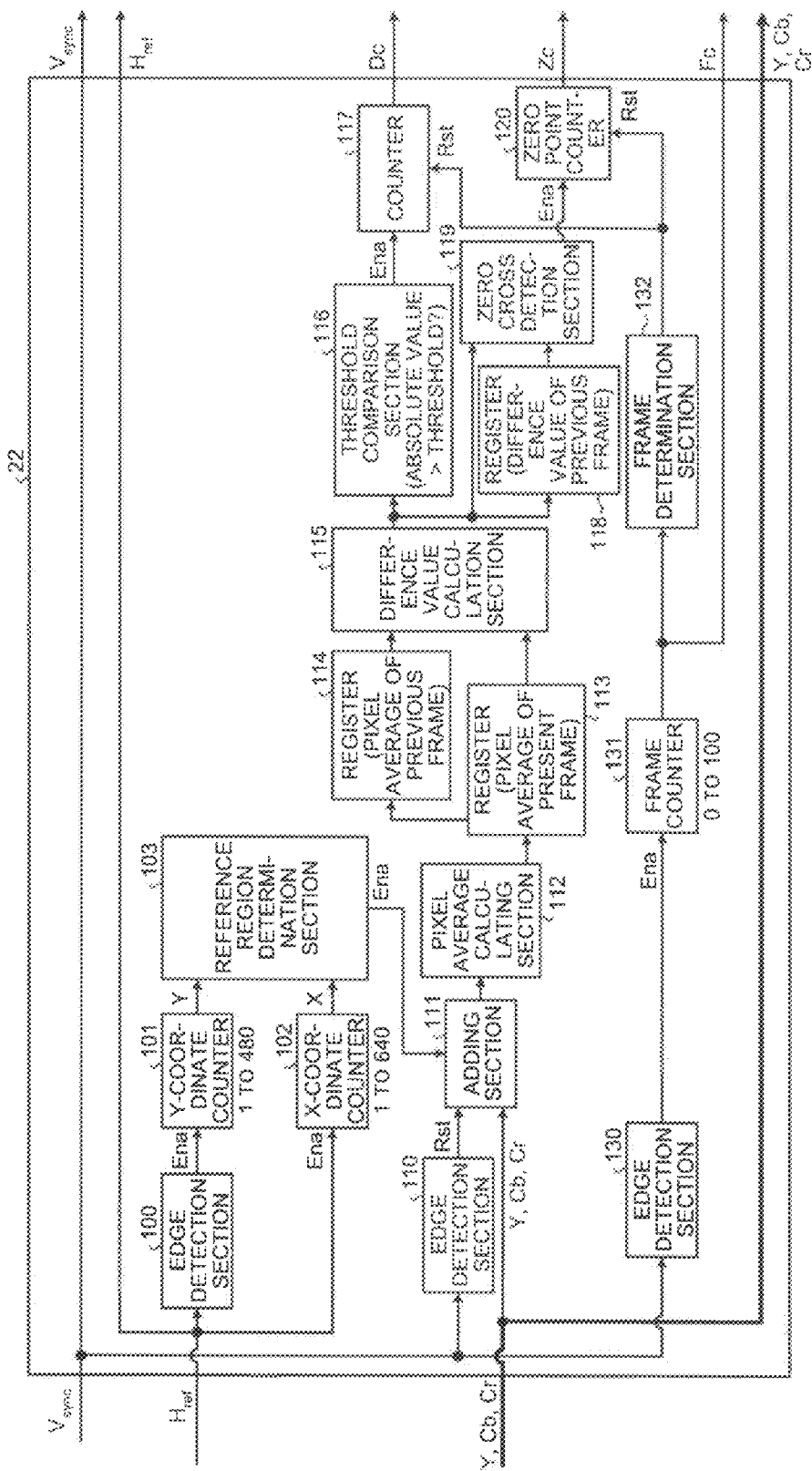
FIG. 7 is a block diagram illustrating an exemplary structure of a flicker detection section.

FIG. 7 illustrates an exemplary structure of the flicker detection section 22. The flicker detection section 22 is supplied with the vertical synchronizing signal $V_{sync}$ and the horizontal effective pixel synchronizing signal $H_{ref}$ that are the outputs from the image capturing unit 10, and three pieces of image data, i.e., the luminance component Y, and the color difference components Cr and Cb that are the outputs from the format conversion section 21. The flicker detection section 22 operates with the clock that is synchronized with the pixel timing and is supplied from a clock generation section (not illustrated).

The vertical synchronizing signal $V_{sync}$ is output from the flicker detection section 22 without being processed, and is supplied to edge detection sections 110 and 130. The horizontal effective pixel synchronizing signal $H_{ref}$ is output from the flicker detection section 22 without being processed, and is supplied to an edge detection section 100 and an X-coordinate counter 102. The three pieces of image data of the luminance component Y, and the color difference components Cr and Cb are output from the flicker detection section 22 without being processed, and any one of the three pieces of image data of the luminance component Y, and the color difference components Cr and Cb (in the embodiment, image data of the luminance component Y) is supplied to an adding section 111.

Figure 8:
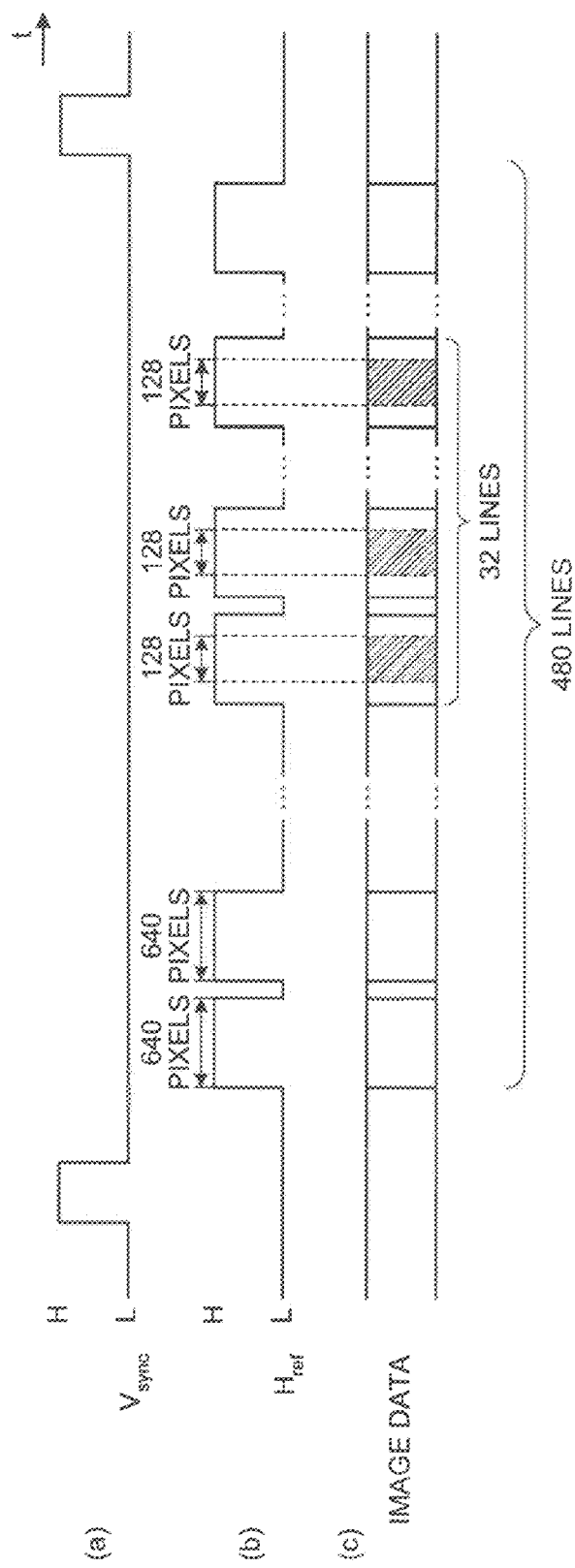
In FIG. 8, a time chart schematically illustrates a vertical synchronizing signal $V_{sync}$ that is supplied to the flicker detection section, a time chart schematically illustrates a horizontal effective pixels synchronizing signal $H_{ref}$ that is supplied to the flicker detection section, and a time chart schematically illustrates an image data that is supplied to the flicker detection section.

In FIG. 8, a panel (a) schematically illustrates a time chart of the vertical synchronizing signal $V_{sync}$ that is supplied to the flicker detection section 22. A panel (b) in FIG. 8 schematically illustrates a time chart of the horizontal effective pixel synchronizing signal $H_{ref}$ that is supplied to the flicker detection section 22. A panel (c) in FIG. 8 schematically illustrates a time chart of an image data that is supplied to the flicker detection section 22. The vertical synchronizing signal $V_{sync}$ exemplarily illustrated in the panel (a) in FIG. 8 represents the head of a frame at its rising edge. The horizontal effective pixel synchronizing signal $H_{ref}$ exemplarily illustrated in the panel (b) in FIG. 8 represents the head of a line at its rising edge and the end of a line at its falling edge. That is, the horizontal effective pixel synchronizing signal $H_{ref}$ shows the effective pixel duration of the line at an H-level which is indicated in the panel (b) in FIG. 8. As exemplarily illustrated in the panel (c) FIG. 8, valid image data is supplied as pixel data synchronized with the clock during a period of time when the horizontal effective pixel synchronizing signal $H_{ref}$ keeps the H-level.

When detecting the rising of the horizontal effective pixel synchronizing signal $H_{ref}$, the edge detection section 100 outputs an enable signal Ena to a Y-coordinate counter 101. When receiving the enable signal Ena, the Y-coordinate counter 101 increments a count value of the Y-coordinate, i.e., a line, by one. The Y-coordinate counter 101 resets the count value when the count value reaches 480. The X-coordinate counter 102 counts a clock during a period of time when the horizontal effective pixel synchronizing signal $H_{ref}$ keeps the H-level and sets the clock as a count value of the X-coordinate. The X-coordinate counter 102 resets the count value when the count value reaches 640.

The count values of the Y-coordinate counter 101 and the X-coordinate counter 102 are both supplied to a reference region determination section 103. In the reference region determination section 103, the coordinates of the reference region in an image are preliminarily set. The reference region determination section 103 outputs the enable signal Ena to the adding section 111 when the count values of the Y-coordinate counter 101 and the X-coordinate counter 102 respectively indicate the Y coordinate and the X coordinate within the reference region.

In the example illustrated in FIG. 3, when the reference region is set to a region of 128 pixels×32 lines at a predetermined location in the image, the enable signal Ena is output during a period of time corresponding to contiguous 128 pixels per line in each of 32 lines out of 480 lines.

When the enable signal Ena is supplied from the reference region determination section 103, the adding section 111 cumulatively adds pixel data values (pixel values) supplied from the format conversion section 21 synchronized with the clock. On the other hand, when detecting the falling of the vertical synchronizing signal $V_{sync}$, the edge detection section 110 outputs a reset signal Rst to the adding section 111. When receiving the reset signal Rst, the adding section 111 outputs cumulatively added pixel values, i.e., the sum of the pixel values of the reference region, to a pixel average calculating section 112, and thereafter resets the sum.

The pixel average calculating section 112 divides the sum of the pixel values of the reference region supplied from the adding section 111 by the number of pixels in the reference region according to formula (1) so as to calculate the pixel average $P_{AVG}$ of the reference region of a present frame.

When the image processing section 20 including the flicker detection section 22 is structured with an FPGA, for example, it is difficult to implement on the FPGA a arithmetic circuit that calculates the pixel average $P_{AVG}$ according to formula (1) for arbitrary values M and N. In this case, if the number of pixels included in the reference region is selected as a number that can be represented by 2 to the n-th power ($2^n$, where n is a natural number), the pixel average $P_{AVG}$ can be obtained by merely shifting right n bits the sum of the pixel values in the reference region. In the example illustrated in FIG. 3 in which the reference region is represented by the area with 128 pixels×32 lines, the average of the pixel values of the reference region can be obtained by shifting right 12 bits the sum because the total number of pixels included in the reference region is $2^{12}$ pixels ($128 \times 32 = 4096 = 2^{12}$).

The pixel average $P_{AVG}$ of the present frame calculated by the pixel average calculating section 112 is supplied to a difference value calculation section 115 and a register 114 through a register 113. When receiving the pixel average $P_{AVG}$ of the present frame supplied from the pixel average calculating section 112, the register 114 outputs the pixel average $P_{AVG}$ that has been stored in processing a previous frame, and stores therein the average $P_{AVG}$ of the present frame. The pixel average $P_{AVG}$ of the previous frame output from the register 114 is supplied to the difference value calculation section 115.

The difference value calculation section 115 calculates a difference value between the pixel average $P_{AVG}$ of the present frame supplied from the register 113 and the pixel average $P_{AVG}$ of the previous frame supplied from the register 114. The calculated difference value is supplied to a threshold comparison section 116, a register 118, and a zero cross detection section 119 as the difference value of the present frame.

The threshold comparison section 116 compares the absolute value of the difference value supplied from the difference value calculation section 115 with a preset threshold. By the comparison, if it is determined that the absolute value exceeds the threshold, the threshold comparison section 116 outputs the enable signal Ena to a counter 117. When receiving the enable signal Ena, the counter 117 increments the count value Dc by one, and then sends the resulting count value Dc to the processor section 26.

When receiving the difference value of the present frame supplied from the difference value calculation section 115, the register 118 outputs a difference value that has been stored in processing the previous frame, and stores therein the difference value of the present frame. The difference value of the previous frame output from the register 118 is supplied to the zero cross detection section 119.

The zero cross detection section 119 determines whether the difference value of the present frame supplied from the difference value calculation section 115 and the difference value of the previous frame supplied from the register 118 have different signs (plus and minus) from each other. If it is determined that they have different signs, the zero cross detection section 119 outputs the enable signal Ena to a zero point counter 120. When receiving the enable signal Ena, the zero point counter 120 increments the count value Zc by one, and then sends the resulting count value Zc to the processor section 26.

When detecting the rising of the vertical synchronizing signal $V_{sync}$, the edge detection section 130 outputs the enable signal Ena to a frame counter 131. When receiving the enable signal Ena, the frame counter 131 increments the frame count value Fc by one, and sends the resulting count value Fc to the processor section 26 and a frame determination section 132. The frame counter 131 resets the frame count value Fc when the frame counter value Fc reaches 100.

The frame determination section 132 determines whether the frame count value Fc is zero. If it is determined that the frame count value Fc is zero, the frame determination section 132 outputs the reset signal Rst to the counter 117 and the zero point counter 120. When receiving the reset signal Rst, the counter 117 resets the counter value Dc while the zero point counter 120 resets the counter value Zc.

The processor section 26 carries out determination processing from step S107 to step S109 in the flowchart of FIG. 6 by using the count values Dc, Zc, and Fc respectively supplied from the counter 117, the zero point counter 120, and the frame counter 131. As a result of the processing, the processor section 26 outputs a flicker cancelation command that matches the light source frequency.

Figure 9A:
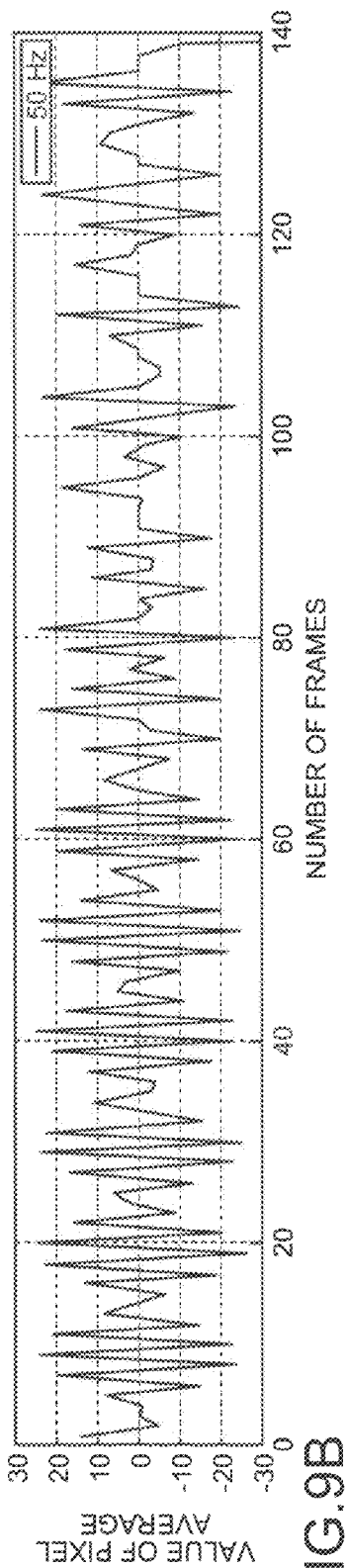
In FIGS. 9A, 9B, and 9C, graphs illustrate inter-frame difference values of the pixel averages $P_{AVG}$ of a reference region obtained by actual measurements in accordance with the elapsed time.
Figure 9B:
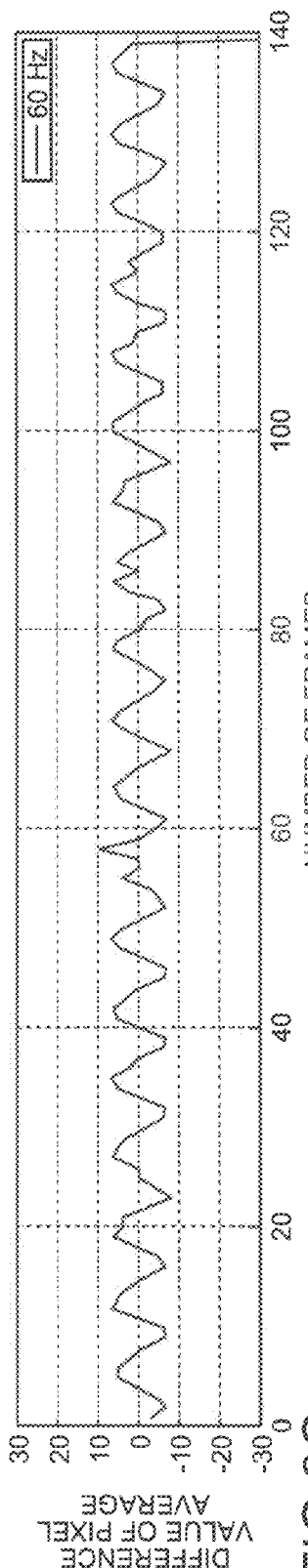
Figure 9C:
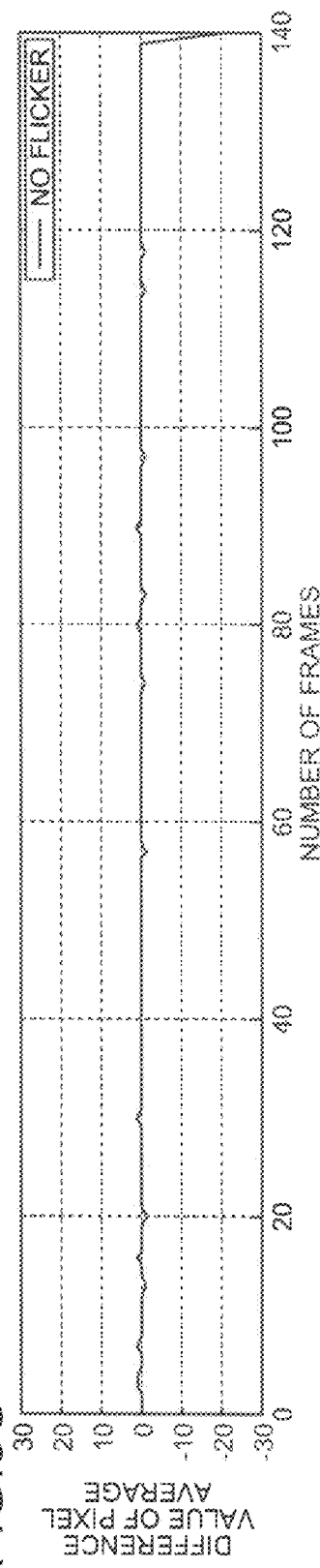

The determination of presence or absence of flicker and the identification of the light source frequency according to the first embodiment are described below with specific examples. FIGS. 9A to 9C and 10A to 10C each exemplarily illustrates the actually measured inter-frame difference values of the pixel average $P_{AVG}$ of a reference region with the elapsed time. FIGS. 9A to 9C illustrate the examples in which the frame rate is 29 fps while FIGS. 10A to 10C illustrate the examples in which the frame rate is 27 fps. In each of FIGS. 9A to 9C and 10A to 10C, the abscissa axis denotes elapsed time in terms of the number of frames whereas the ordinate axis denotes the difference value.

FIGS. 9C and 10C illustrate, respectively, the cases in which no flicker occurs. When no flicker occurs, the inter-frame difference values of the pixel average $P_{AVG}$ rarely vary as illustrated in FIGS. 9C and 10C.

FIG. 9A and FIG. 9B show the cases for which the light source frequency is 50 Hz and 60 Hz, respectively. Since the frame rate is 29 fps (>27.5 Hz), a variation of the inter-frame difference values for the pixel average $P_{AVG}$ becomes small in the example illustrated in FIG. 9B in which the blinking period of the light source frequency is 60 Hz that is closer to an integral multiple of the frame rate than the example illustrated in FIG. 9A.

A first example is described when the frame rate of image data is 29 fps, and a predetermined value is 100 frames that is to be compared with the frame count value Fc at step S107 in the flowchart of FIG. 6. In this example, flicker is generated under the light source frequency of 50 Hz and 60 Hz, and the count value Zc is counted that represents the number of times when the inter-frame difference value of the pixel average $P_{AVG}$ crosses the zero point between a present frame and a previous frame. In the cases of FIGS. 9A and 9B, the count value Zc after processing 100 frames was counted as 88 times and 32 times, respectively.

In this example, the light source frequency can be determined as 50 Hz or 60 Hz if the predetermined value Zth that is compared with the count value Zc in the flowchart of FIG. 6 is set to around 45 times, for example. In the first example, it was verified that flicker could be cancelled with the completion of the switching of the light source frequency after about four seconds from when the light source frequency had been changed to either 50 Hz or 60 Hz.

A second example is described when the frame rate of image data is 29 fps, and a predetermined value is 50 frames that is compared with the frame count value Fc at step S107. In the example, the count value Zc after processing 50 frames was counted as 44 times and 16 times in the cases of FIGS. 9A and 9B, respectively. Accordingly, the light source frequency can be determined as 50 Hz or 60 Hz if the predetermined value Zth that is compared with the count value Zc in the flowchart of FIG. 6 is set to around 23 times, for example. In the second example, it was verified that flicker could be cancelled with the completion of the switching of the light source frequency after about two seconds from when the light source frequency had been changed to either 50 Hz or 60 Hz.

A third example is described when the frame rate of image data is 27 fps (<27.5 Hz), and a predetermined value is 100 frames that is compared with the frame count value Fc at step S107 in the flowchart of FIG. 6.

FIG. 10A illustrates the case in which the light source frequency is 50 Hz while FIG. 10B is the case in which the light source frequency is 60 Hz. Since the frame rate is 27 fps, the variation of the inter-frame difference values of the pixel average $P_{AVG}$ is small in the case illustrated in FIG. 10A in which the blinking period of the light source frequency is 50 Hz that is closer to an integral multiple of the frame rate than the example illustrated in FIG. 10B.

In the cases of FIGS. 10A and 10B, the count value Zc after processing 100 frames was counted as 52 times and 80 times, respectively. Accordingly, the light source frequency can be determined as 50 Hz or 60 Hz if the predetermined value Zth that is compared with the count value Zc in the flowchart of FIG. 6 is set to around 65 times, for example. In the third example, it was verified that flicker could be cancelled with the completion of the switching of the light source frequency after about four seconds from when the light source frequency had been changed to either 50 Hz or 60 Hz.

A fourth example is described when the frame rate of image data is 27 fps, and a predetermined value is 50 frames that is compared with the frame count value Fc at step S107. In the fourth example, flicker is generated under the light source frequency of 50 Hz and 60 Hz, and the count value Zc is counted that represents the number of times when the inter-frame difference value of the pixel average $P_{AVG}$ crosses the zero point between a present frame and a previous frame. In the cases of FIGS. 10A and 10B, the count value Zc after processing 50 frames was counted as 26 times and 40 times, respectively.

Accordingly, the light source frequency can be determined as 50 Hz or 60 Hz if the predetermined value Zth that is compared with the count value Zc in the flowchart of FIG. 6 is set to around 32 times, for example. In the fourth example, it was verified that flicker could be cancelled with the completion of the switching of the light source frequency after about two seconds from when the light source frequency had been changed to either 50 Hz or 60 Hz.

Figure 11:
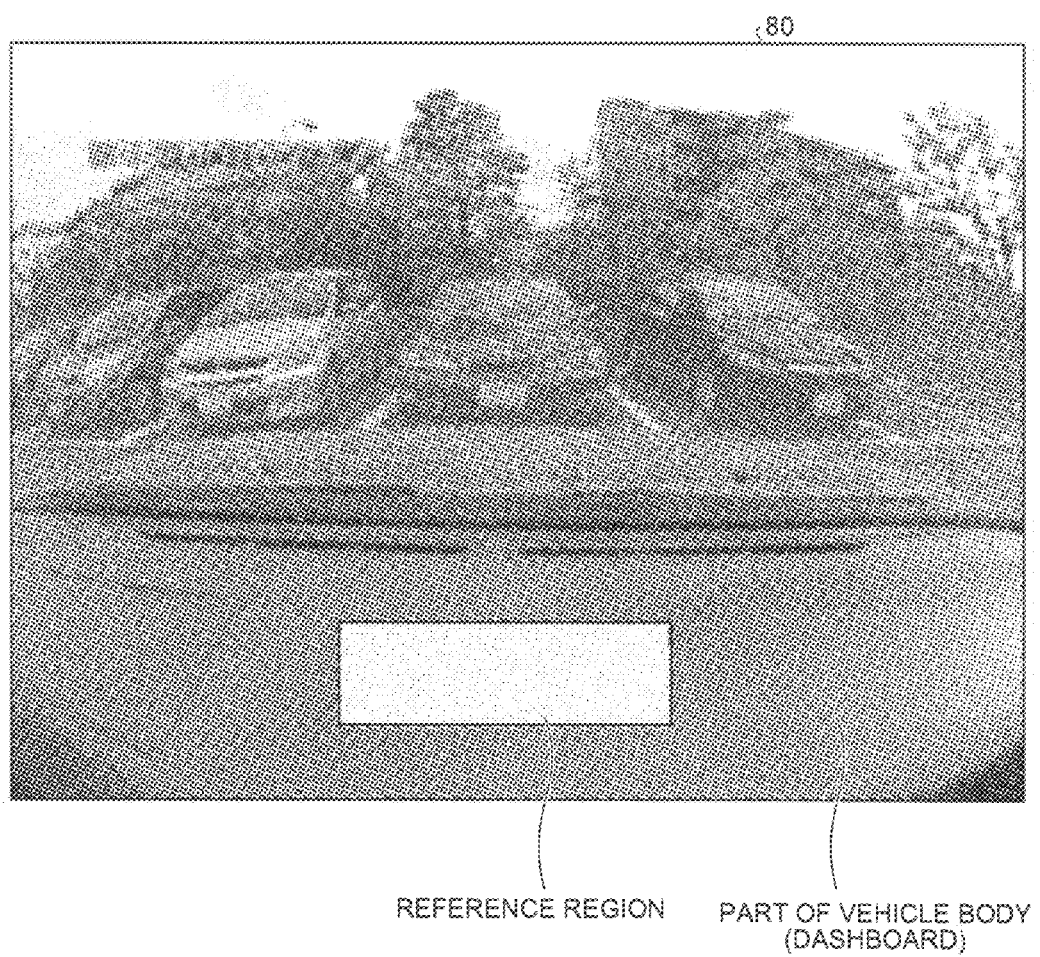
FIG. 11 is a photograph to explain that an image region showing a part of a vehicle's body unexpectedly captured in an image is set to be a reference region.

In the above descriptions, the reference region can be set to any location in an image represented by image data output from the image capturing unit 10. The location setting of the reference region is not limited to the above descriptions. For example, malfunction can be prevented by setting a reference region in an image region of a captured subject that has a fixed positional relationship with respect to the image capturing unit 10. In the example of in-vehicle applications, a reference region can be set to a partial image region of a vehicle's body unexpectedly captured in an image. More specifically, as exemplarily illustrated in FIG. 11, a dashboard serving as part of a vehicle's body is unexpectedly captured at a lower part of the captured image 80 when an image capturing apparatus including an image capturing unit having an optical system using a wide-angle lens is fixed in the vicinity of a rearview mirror. Then, the reference region is set to an image region of the dashboard.

In the above descriptions, image data output from the image capturing unit 10 is obtained by progressive scanning. The present invention is also applicable to image data obtained by interlace scanning. When image data output from the image capturing unit 10 is data obtained by interlace scanning such as the national television system committee (NTSC) method, the image data become the field image data composed of a first field of odd lines in one frame and a second field of even lines in the frame as exemplarily illustrated in FIG. 12A.

Figures 12A, 12B:
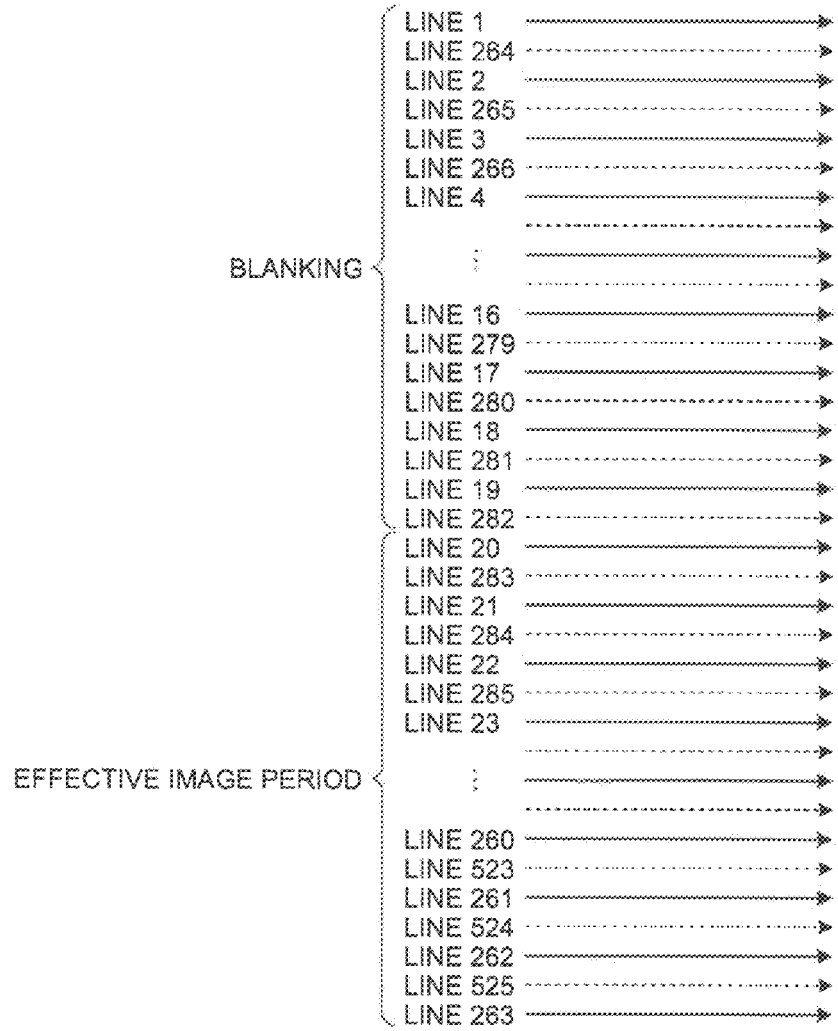
FIGS. 12A and 12B are schematics illustrating image data obtained by interlace scanning.

In this case, as illustrated in FIG. 12B, from line 1 to line 263 that are disposed in every other line correspond to the first field image data while from line 264 to line 525 that are disposed in every other line correspond to the second field image data, in image data of one frame. In the first field, the lines from line 1 to line 19 are positioned in a vertical blanking period while the lines from line 20 to line 263 are positioned in an effective image period. Likewise, in the second field, the lines from line 264 to line 282 are positioned in the vertical blanking period while the lines from line 283 to line 525 are positioned in the effective image period.

In this way, one frame of image data are composed of two sets of field image data. Accordingly, the pixel average $P_{AVG}$ can be obtained with reference to either field image data of the first field or the second field. In addition, the pixel average $P_{AVG}$ may be obtained with reference to field image data of both the first field and the second field.

Second Embodiment

A second embodiment of the present invention is described below. In the first embodiment, flicker appearing as stripes extending in the horizontal direction is detected based on the average of the pixel values of the pixels within the reference region, and when flicker is detected, flicker is suppressed by switching the value of the register for canceling flicker. In this case, factors other than flicker to be detected may result in the erroneous determination of presence or absence of flicker. That is, it may be determined that flicker occurs even though flicker is not actually occurring.

An exemplary factor of the erroneous determination is that the image capturing unit 10 automatically alters exposure time according to the variation of the amount of light that enters the image capturing unit 10. As an example of such alteration, the image capturing unit 10 measures luminance in a predetermined range within a captured image represented with image data, and obtains the average of luminance of the predetermined range. When the average of luminance exceeds an upper limit of a predetermined luminance permissible range (bright), exposure time is shortened without changing a period of exposure so as to darken the captured image. On the contrary, when the average of luminance is smaller than a lower limit of the luminance permissible range (dark), exposure time is elongated without changing a period of exposure so as to brighten the captured image.

The changing of the exposure time in this way fine-tunes brightness of the image represented with image data output from the image capturing unit 10. This fine tuning may cause the erroneous determination of presence or absence of flicker.

In the second embodiment, an exposure value is acquired from the image capturing unit 10 on a frame-by-frame basis, and the acquired exposure value of a present frame and the exposure value acquired from a previous frame are compared with each other. If a change is detected between the exposure values of the present frame and the previous frame during a predetermined period of time, the value of the flicker cancelation register is not switched. This processing enables flicker detection to be carried out with high accuracy. As a result, the erroneous determination of presence or absence of flicker can be prevented. Here, the exposure value means exposure time in each exposure period.

Figure 13:
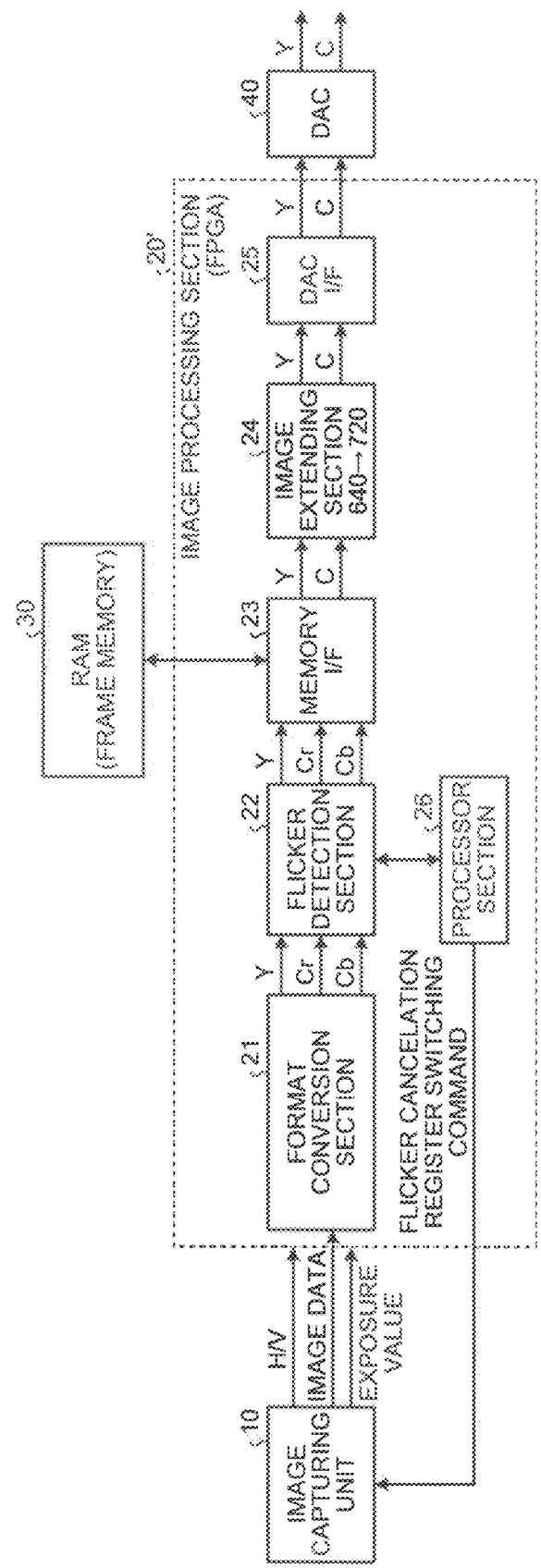
FIG. 13 is a block diagram illustrating an exemplary structure of an image capturing apparatus applicable to a second embodiment of the present invention.

FIG. 13 schematically illustrates an example of an image capturing apparatus applicable to the second embodiment. In FIG. 13, the same elements as those in FIG. 1 are labeled with the same numerals, and detailed description thereof is omitted. The image capturing apparatus illustrated in FIG. 13 differs from the image capturing apparatus illustrated in FIG. 1 in that an image processing section 20' obtains an exposure value from the image capturing unit 10.

In the embodiment, the image capturing unit 10 can change an exposure amount according to a light amount of incident light. For example, the image capturing unit 10 changes an exposure amount according to a light amount of incident light in such a manner that a level of output image data falls in a predetermined range. As described above, the exposure amount is controlled by setting exposure time in each exposure with a value (exposure value) written in the register included in the image capturing unit 10.

Figure 14:
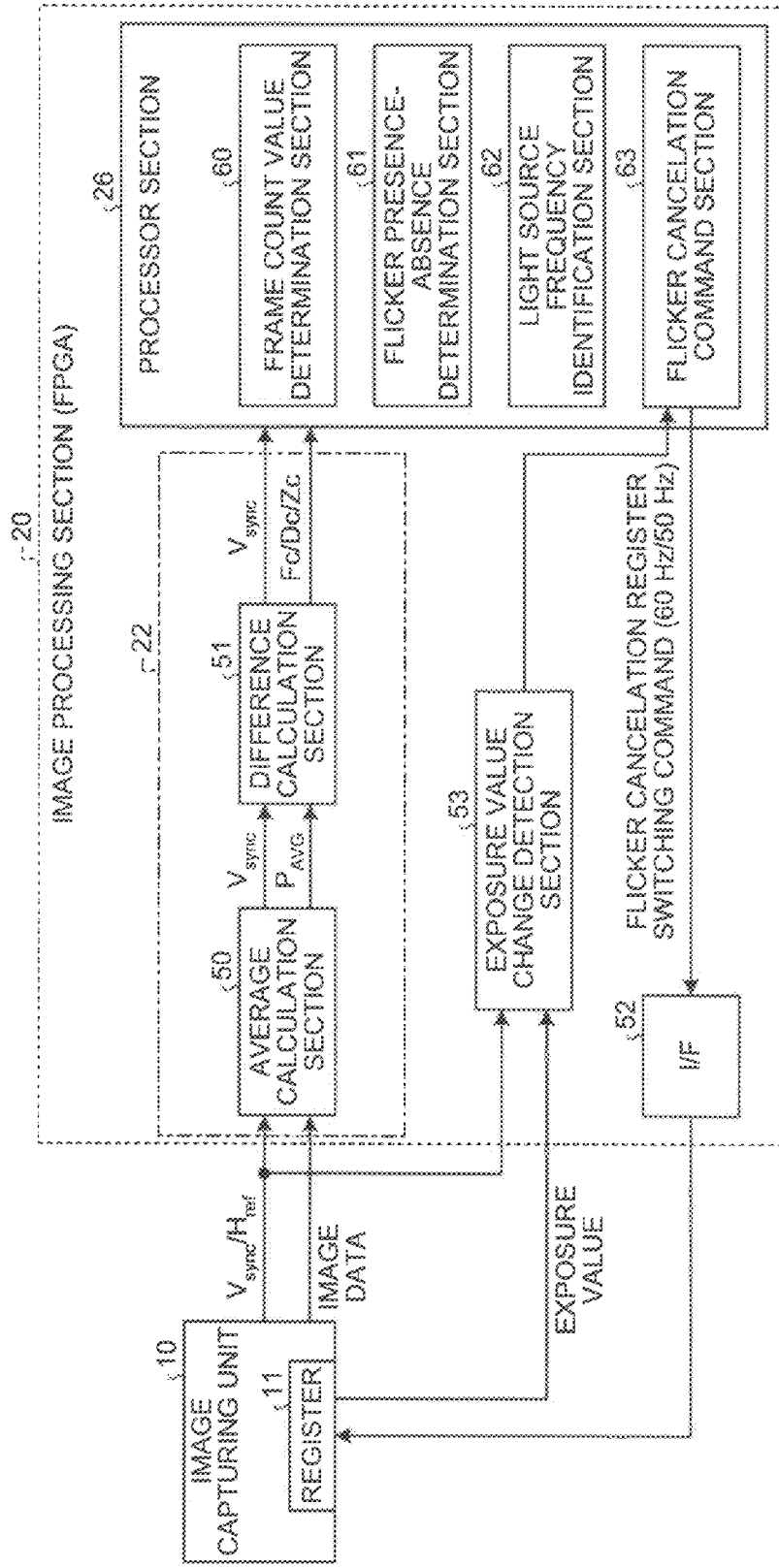
FIG. 14 is a functional block diagram illustrating a structure of an image processing section with selected sections closely related to the second embodiment.

FIG. 14 is a functional block diagram illustrating the image processing section 20' included in the image capturing apparatus of the second embodiment with selected sections closely related to the second embodiment. In FIG. 14, the same elements as those in FIG. 2 are labeled with the same numerals, and detailed description thereof is omitted. The image processing section 20' illustrated in FIG. 14 differs from the image processing section 20 illustrated in FIG. 2 in that an exposure value change detection section 53 is added to the image processing section 20'.

In the image capturing unit 10, an exposure value is written in the register 11. The image capturing unit 10 rewrites an exposure value written in the register 11 according to a change of an exposure amount.

In the image processing section 20', the exposure value change detection section 53 acquires an exposure value from the register 11 every frame of image data output from the image capturing unit 10 with reference to the vertical synchronizing signal $V_{sync}$, and retains the value in an exposure value retaining section (not illustrated), such as a register. The exposure value change detection section 53 compares the acquired exposure value of a present frame with the exposure value of a previous frame retained in the exposure value retaining section, and determines whether the exposure value of the present frame is changed (different) from the exposure value of the previous frame.

The flicker cancelation command section 63 produces no flicker cancelation register switching command if the exposure value change detection section 53 determines that the exposure value of the present frame is changed from the exposure value of the previous frame. As a result, a latest flicker cancelation state is kept in the image capturing unit 10.

FIG. 15 is a flowchart illustrating exemplary processing of a flicker suppression method of the second embodiment. In the flowchart of FIG. 15, the same processing as the flowchart of FIG. 6 is labeled with the same numeral, and detailed description thereof is omitted. The processing illustrated in the flowchart of FIG. 15 is an example when the frame rate fr of image data output from the image capturing unit 10 is the same rate as the flowchart of FIG. 6, i.e., 25 Hz<fr<27.5 Hz. The frame count values Fc, Dc, and Zc are initialized to zero prior to the processing illustrated in the flowchart. In addition, a value of a flag used for exposure value change determination is initialized to zero.

In FIG. 15, the processing from step S100 to step S104 is the same as the corresponding processing in the flowchart of FIG. 6, and description thereof is omitted. At step S105, the flicker detection section 22 determines whether the pixel average $P_{AVG}$ of a present frame has crossed the zero point with respect to the pixel average $P_{AVG}$ of the previous frame. If it is determined that the pixel average $P_{AVG}$ of the present frame has not crossed the zero point, the processing proceeds to step S200. On the contrary, if it is determined that the pixel average $P_{AVG}$ of the present frame has crossed the zero point, the count value Zc is incremented by one at step S106, and the processing proceeds to step S200.

At step S200, the exposure value change detection section 53 acquires an exposure value of the present frame from the register 11, and an exposure value of the previous frame from the exposure value retaining section. At step S201, the exposure value change detection section 53 compares the exposure value of the present frame with the exposure value of the previous frame that have been acquired at step S200, and determines whether the exposure value has been changed. For example, when the exposure value is represented with eight bits, i.e., from 0 to 255, it is determined that the exposure value has been changed if there is a difference of being equal to or larger than one between the exposure values of the present frame and the previous frame. The difference for determination is not limited to this. It can be determined that the exposure value has been changed if the difference exceeds a threshold. If it is determined that the exposure value is changed, the processing proceeds to step S202 where a value of the flag is set to one. Thereafter, the processing proceeds to step S107.

On the other hand, if it is determined that the exposure value has not been changed because the exposure value of the present frame is equal to the exposure value of the previous frame, the processing proceeds to step S107. At step S107, the frame count value determination section 60 determines whether the frame count value Fc exceeds a predetermined value. If it is determined that the frame count value Fc does not exceed the predetermined value, the processing returns to step S100. In contrast, if it is determined that the frame count value Fc exceeds the predetermined value, the processing proceeds to step S108.

At step S108, the flicker presence-absence determination section 61 determines whether the count value Dc exceeds the preset threshold Dth so as to detect presence or absence of flicker. If it is determined that the count value Dc does not exceed the threshold Dth, the processing returns to step S100 so as to process a subsequent frame. On the contrary, if it is determined that the count value Dc exceeds the threshold Dth, the processing proceeds to step S109.

At step S109, the light source frequency identification section 62 compares the count value Zc with the predetermined value Zth so as to identify the light source frequency. As a result of the comparison, if it is determined that the count value Zc exceeds the predetermined value Zth, the light source frequency is identified as 60 Hz, and the processing proceeds to step S203. At step S203, the flicker cancelation command section 63 determines whether the value of the flag is zero.

If it is determined that the value of the flag is zero, the processing proceeds to step S110. At step S110, the flicker cancelation command section 63 produces a flicker cancelation register switching command for canceling flicker under the light source frequency of 60 Hz. The command is supplied to the I/F 52 so as to rewrite a value of the register 11 included in the image capturing unit 10.

Conversely, if it is determined that the value of the flag is not zero at step S203, the processing proceeds to step S205, where the value of the flag is initialized to zero. Thereafter, the processing returns to step S100. In other words, when the flag has a value other than zero (in this case, the value of the flag is one), the processing proceeds in such a manner that the flicker cancelation command section 63 does not produce a flicker cancelation register switching command because the non-zero flag value means that the exposure value of the present frame has been changed from the exposure value of the previous frame.

If it is determined that the count value Zc is equal to or smaller than the predetermined value Zth as the comparison result of step S109, the light source frequency identification section 62 identifies the light source frequency as 50 Hz, and the processing proceeds to step S204. At step S204, the flicker cancelation command section 63 determines whether the value of the flag is zero.

If it is determined that the value of the flag is zero, the processing proceeds to step S111, where the flicker cancelation command section 63 produces a flicker cancelation register switching command for canceling flicker under the light source frequency of 50 Hz. The command is supplied to the I/F 52 so as to rewrite a value of the register 11 included in the image capturing unit 10.

On the contrary, if it is determined that the value of the flag is not zero at step S204, the processing proceeds to step S205. At step S205, the value of the flag is initialized to zero, and the processing returns to step S100. In the same manner as described above, when the flag has a value other than zero (in this case, the value of the flag is one), the processing proceeds in such a manner that the flicker cancelation command section 63 does not produce a flicker cancelation register switching command because the non-zero flag value means that the exposure value of the present frame has been changed from the exposure value of the previous frame.

When processing of step S110 or step S111 is completed, the processing returns to step S100 so as to process a subsequent frame in the same manner as described above.

In the second embodiment as described above, a change of the exposure value is detected, and when the exposure value has been changed, the light source frequency canceling flicker is not switched. The processing enables flicker detection to be carried out with high accuracy. As a result, the erroneous determination of presence or absence of flicker can be avoided.

In the above descriptions, when it is determined that the exposure value of the present frame has been changed from the exposure value of the previous frame, the processing proceeds in such a manner that the flicker cancelation command section 63 does not produce a flicker cancelation register switching command. However, the processing is not limited to this case. For example, the processing may proceed in such a manner that the identification processing of the light source frequency carried out by the light source frequency identification section 62 is omitted when it is determined that the exposure value of the present frame has been changed from the exposure value of the previous frame.

The present invention exhibits an effect that the light source frequency of a subject can be identified by simple processing and a simple system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a difference calculation unit that calculates a difference value indicating a difference between a feature amount of a predetermined region of a frame of image data taken by and output by an image capturing unit capturing a subject and a feature amount of the predetermined region of a past frame relative to the frame of the image data;
a first counting unit that counts number of times when an absolute value of the difference value calculated by the difference value calculation unit exceeds a threshold during a predetermined period of time;
a second counting unit that counts number of times when the difference value calculated by the difference value calculation unit on a present frame of the image data and the difference value calculated by the difference value calculation unit on a past frame of the image data have different plus-minus signs from each other during a predetermined period of time; and
an identification unit that compares the number of times counted by the second counting unit with a predetermined value when the number of times counted by the first counting unit exceeds a predetermined value, and based on a comparison result thus obtained, identifies a light source frequency of a light source under which the subject is captured.

2. The image processing apparatus according to claim 1, wherein the difference calculation unit uses a sum of pixel values of pixels included in the predetermined region as the feature amount.

3. The image processing apparatus according to claim 2, wherein the difference calculation unit uses a value obtained by dividing the sum by the number of pixels included in the predetermined region as the feature amount.

4. The image processing apparatus according to claim 1, wherein a ratio of a size of the predetermined region in a vertical direction to a size of an image represented with the image data in the vertical direction is smaller than a ratio of a frame rate of the image data to four times the light source frequency serving as a reference.

5. The image processing apparatus according to claim 4, wherein the difference calculation unit calculates the feature amount by using a luminance value as the pixel value.

6. The image processing apparatus according to claim 1, wherein the predetermined region is an image region of a subject having a fixed positional relationship with respect to the image capturing unit in the image represented with the image data.

7. The image processing apparatus according to claim 6, wherein
  the image capturing unit is used by being mounted to a vehicle's body, and
  the predetermined region is a region corresponding to part of the vehicle's body serving as a subject.

8. The image processing apparatus according to claim 1, further comprising a setting unit that sets a setting for canceling flicker corresponding to the light source frequency identified by the identification unit to the image capturing unit.

9. The image processing apparatus according to claim 8, further comprising a detection unit that acquires an exposure value of the present frame from the image capturing unit, and detects a change of the acquired exposure value of the present frame from an exposure value of the past frame having been acquired from the image capturing unit, wherein
  the setting unit does not set the setting for canceling flicker when the detection unit detects the change within the predetermined period of time.

10. The image processing apparatus according to claim 1, wherein when the image data is obtained by interlace scanning, either a first field or a second field is used as the frame.

11. An image processing method comprising:
  calculating a difference value, by a difference calculation unit, indicating a difference between a feature amount of a predetermined region of a frame of image data taken and output by an image capturing unit that captures a subject and a feature amount of the predetermined region of a past frame relative to the frame of the image data;
  counting number of times, by a first counting unit, when an absolute value of the difference value calculated at the calculating the difference value exceeds a threshold during a predetermined period of time;
  counting number of times, by a second counting unit, when the difference value calculated at the difference value calculation unit on a present frame of the image data and the difference value calculated at the difference value calculation unit on a past frame of the image data have different plus-minus signs from each other during a predetermined period of time; and
  comparing, by an identification unit, the number of times counted by the second counting unit with a predetermined value when the number of times counted by the first counting unit exceeds a predetermined value, and identifying a light source frequency of a light source under which the subject is captured based on a comparison result.

12. An image capturing apparatus comprising:
an image capturing unit; and
the image processing apparatus according to claim 1.

* * * * *